(12) United States Patent
Menkhoff

(10) Patent No.: US 9,201,447 B2
(45) Date of Patent: *Dec. 1, 2015

(54) APPARATUS AND METHOD USING FIRST AND SECOND CLOCKS

(71) Applicant: Intel Mobile Communications GMbH, Neubiberg (DE)

(72) Inventor: Andreas Menkhoff, Oberhaching (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/924,526

(22) Filed: Jun. 21, 2013

(65) Prior Publication Data

US 2014/0006839 A1 Jan. 2, 2014

Related U.S. Application Data

(63) Continuation of application No. 12/201,505, filed on Aug. 29, 2008, now Pat. No. 8,510,589.

(51) Int. Cl.
| | |
|---|---|
| *G06F 1/00* | (2006.01) |
| *G06F 1/04* | (2006.01) |
| *G06F 1/14* | (2006.01) |
| *G06F 1/24* | (2006.01) |
| *G06F 11/00* | (2006.01) |
| *H04B 1/10* | (2006.01) |
| *G06F 1/08* | (2006.01) |

(52) U.S. Cl.
CPC ... *G06F 1/08* (2013.01); *G06F 1/04* (2013.01)

(58) Field of Classification Search
CPC ............ G06F 1/08; G06F 1/324; G06F 1/04; G06F 1/06; G06F 1/12; H03L 7/087

USPC ........... 713/500–503; 327/115, 144, 147, 156
See application file for complete search history.

(56) References Cited

U.S. PATENT DOCUMENTS

| | | | | |
|---|---|---|---|---|
| 5,040,197 | A | * | 8/1991 | Theobald ........................ 377/48 |
| 5,331,671 | A | * | 7/1994 | Urbansky ....................... 375/371 |
| 5,796,995 | A | * | 8/1998 | Nasserbakht et al. ........ 713/503 |
| 6,624,674 | B1 | * | 9/2003 | Zhao .............................. 327/156 |
| 6,983,394 | B1 | * | 1/2006 | Morrison et al. ............. 713/500 |
| 7,479,912 | B1 | * | 1/2009 | Xianggang et al. ........... 341/144 |
| 7,656,234 | B2 | * | 2/2010 | Satoh ........................... 331/1 A |
| 8,510,589 | B2 | * | 8/2013 | Menkhoff ...................... 713/502 |
| 8,819,100 | B2 | * | 8/2014 | Menkhoff ...................... 708/523 |
| 2002/0141522 | A1 | * | 10/2002 | Colborne et al. ............. 375/355 |
| 2009/0063820 | A1 | * | 3/2009 | Xi et al. ........................ 712/208 |
| 2009/0184735 | A1 | * | 7/2009 | Wicki et al. ....................... 327/9 |
| 2009/0243934 | A1 | * | 10/2009 | Ameti et al. .................. 342/465 |

* cited by examiner

*Primary Examiner* — Faisal M Zaman
(74) *Attorney, Agent, or Firm* — Green, Howard & Mughal, LLP

(57) ABSTRACT

Receiving an indication of a frequency ratio of first and second clocks; generating an indication of a number of clock pulses of the second clock occurring between first and second clock pulses of the first clock; and generating an indication of a time offset between (1) a clock pulse of the second clock occurring between the second clock pulse and a third clock pulse of the first clock, and (2) the second clock pulse of the first clock. Also, receiving an input data word representing a fractional number, a first part of the input data word comprising an integer portion of the fractional number and a second part comprising a decimal portion of the fractional number; providing a first output data word that is either the first part of the input data word or an increment by one of the first part; and providing a second output data word that is an integer multiple of the second part.

22 Claims, 2 Drawing Sheets

US 9,201,447 B2

APPARATUS AND METHOD USING FIRST AND SECOND CLOCKS

BACKGROUND

Digital circuits may comprise multiple components working on different frequency clocks. For a proper operation of such digital circuits, information on the different frequency clocks and their interdependencies is desirable.

Numerically controlled oscillators (NCO) are used in a wide range of timing applications. Conventional NCOs synthesize a range of frequencies in response to a digital signal. Here, the range of frequencies generated by an NCO is related to the bit resolution of the input digital signal and the clock used to control the NCO.

SUMMARY

Various aspects are described herein. For example, some aspects are directed to methods and apparatuses for receiving an indication of a frequency ratio of first and second clocks; generating an indication of a number of clock pulses of the second clock occurring between first and second clock pulses of the first clock; and generating an indication of a time offset between (1) a clock pulse of the second clock occurring between the second clock pulse and a third clock pulse of the first clock, and (2) the second clock pulse of the first clock.

Further aspects are directed to methods and apparatuses for receiving an input data word representing a fractional number, a first part of the input data word comprising an integer portion of the fractional number and a second part comprising a decimal portion of the fractional number; providing a first output data word that is either the first part of the input data word or an increment by one of the first part; and providing a second output data word that is an integer multiple of the second part.

These and other aspects will be described in the following Detailed Description of Illustrative Embodiments.

BRIEF DESCRIPTION OF THE SEVERAL VIEWS OF THE DRAWINGS

Various aspects as described herein are made more evident by way of example in the following detailed description of illustrative embodiments when read in connection with the attached figures.

DETAILED DESCRIPTION OF ILLUSTRATIVE EMBODIMENTS

Figure 1:
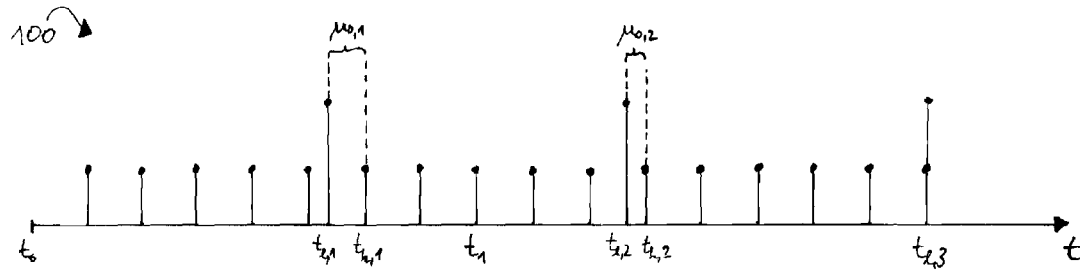
FIG. 1 shows an illustrative timing diagram 100.

In the following one or more aspects and embodiments are described with reference to the drawings, wherein like reference numerals are generally utilized to refer to like elements throughout. In the following description, for purposes of explanation, numerous specific details are set forth in order to provide a thorough understanding. It may be evident, however, to one skilled in the art that one or more aspects as described herein may be practiced with a lesser degree of these specific details. In other instances, known structures and devices are shown in block diagram form in order to facilitate describing the one or more aspects. The following description is not to be taken in a limiting sense, and rather should be taken in an illustrative sense.

In addition, while a particular feature or aspect of an embodiment may be disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the disclosure or the claims, such terms are intended to be inclusive in the same manner as the term "comprise". The terms "coupled" and "connected", along with derivatives may be used. It should be understood that these terms may be used to indicate that two elements cooperate or interact with each other regardless of whether they are in direct or indirect physical, electrical, or other type of communicative contact. Also, the term "exemplary" or "illustrative" refers to merely an example, rather than necessarily the best or optimal.

FIG. 1 shows an illustrative timing diagram 100 based on a low frequency clock and a high frequency clock, both starting at a time $t_0$. The terms "low" and "high" frequency as used herein are relative terms and do not imply any absolute frequency ranges. The timing diagram 100 shows three clock pulses of the low frequency clock (cf. high peaks at times $t_{1,1}$, $t_{1,2}$ and $t_{1,3}$) and sixteen clock pulses of the high frequency clock (cf. low peaks such as at time $t_1$). Since frequency ratios of the high frequency clock and the low frequency clock correspond to a fractional number (e.g. 16/3 or 3/16), the clock pulses of the high frequency clock do not coincide with the clock pulses of the low frequency clock at the times $t_{1,1}$ and $t_{1,2}$. The first time of coincidence between the two frequency clocks is given at the time $t_{1,3}$.

During a first time interval between the times $t_0$ and $t_{1,1}$ five clock pulses of the high frequency clock occur. Similarly, five clock pulses of the high frequency clock occur during a second time interval between the times $t_{1,1}$ and $t_{1,2}$. Here, the first clock pulse of the high frequency clock in the second time interval (cf. time $t_{h,1}$) does not coincide with the first clock pulse of the low clock frequency at the time $t_{1,1}$. Instead, the clock pulse of the high frequency clock at the time $t_{h,1}$ is arranged 2/3 (in units of the high frequency clock) to the right of the time $t_{1,1}$. A parameter $\mu_{O,1}$ denotes a corresponding value of the time offset.

A third time interval is given between the times $t_{1,2}$ and $t_{1,3}$. Six clock pulses of the high frequency clock occur in this third time interval, wherein the clock pulses of the low frequency clock and the high frequency clock coincide at the time $t_{1,3}$. The first clock pulse of the high frequency clock in the third time interval (cf. time $t_{h,2}$) is arranged 1/3 (in units of the high frequency clock) to the right of the time $t_{1,2}$. A corresponding value of the time offset is denoted by a parameter $\mu_{O,2}$.

It is understood that further time intervals may succeed the described three time intervals. Such further time intervals may be obtained by simply repeating the first three time intervals. For example, a fourth time interval would then correspond to the first time interval, a fifth time interval would correspond to the second time interval and a sixth time interval would correspond to the third time interval.

Figure 2:
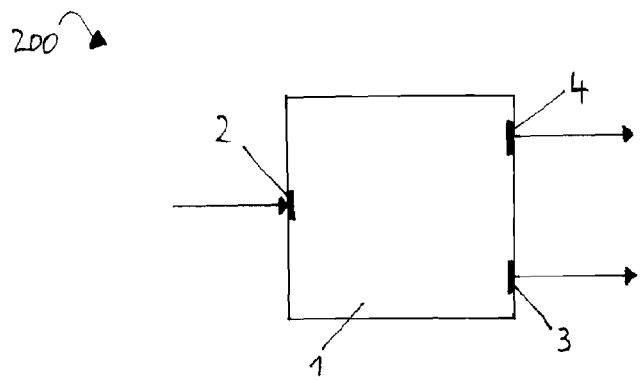
FIG. 2 schematically illustrates a digital device 200 as an exemplary embodiment.

FIG. 2 schematically illustrates a digital device 200 as an exemplary embodiment. In the following, the device 200 may also be denoted by the reference sign 1. The digital device 1 includes a first input 2 configured to receive a signal indicating a ratio of the frequencies of a low frequency clock and a high frequency clock. Referring back to FIG. 1, the ratio may take a value of, for instance, 3/16 or 16/3. The device 1 further includes a first output 3 configured to provide a signal indicating a first value indicating the number of clock pulses of the high frequency clock occurring between a first clock pulse and a second clock pulse of the low frequency clock. In terms of the example of FIG. 1, the first output 3 may thus output a signal indicating a value of five (cf. first time interval between the times $t_0$ and $t_{1,1}$ and second time interval between the times $t_{1,1}$ and $t_{1,2}$) or a value of six (cf. third time interval between the times $t_{1,2}$ and $t_{1,3}$).

The device 200 further includes a second output 4 to provide a signal indicating a second value indicating a time offset between a clock pulse of the high frequency clock, which occurs between the second clock pulse and a third clock pulse of the low frequency clock, and the second clock pulse of the low frequency clock. Referring back to the example of FIG. 1, the second output 4 may output a value of $\mu_{O,1}$ (i.e. 2/3 in units of the high frequency clock) in connection with the first time interval, or a value of $\mu_{O,2}$ in connection with the second time interval and a value of one in connection with the third time interval.

Of course, if the time offsets $\mu_{O,1}$ and $\mu_{O,2}$ are known, any time offset between arbitrary clock pulses of the low and the high frequency clock may be determined by simply adding multiples of the clock frequencies. For example, the time offset between the high frequency clock pulse at a time $t_1$ and the low frequency clock pulse at the time $t_{1,1}$ may be obtained by adding the time offset $\mu_{O,1}$ and two clock periods of the high frequency clock.

The first input 2 may be configured, for example, to receive an input data word representing a fractional number which may represent the ratio of the low frequency clock and the high frequency clock. The input data word may be in the form of a binary bit sequence, but may also be based on any other numerical system.

The input data word may include a first part and a second part, wherein the first part includes an integer portion of the fractional number and the second part includes a decimal portion of the fractional number. Note that the expression "decimal portion" may also be replaced by the expression "fractional portion". For example, if the fractional number is 16/3, the first part of the data word includes an integer portion of five, while the second part of the data word includes a decimal portion of 1/3. The sum of the integer portion and the decimal portion thus equals the fractional number.

The first output 3 may be configured to provide a first output data word which is the first part of the input data word or an increment of the first part of the input data word. Referring back to FIG. 1, a ratio of the low frequency clock and the high frequency clock may be given by a fractional number such as 16/3. In this example, the first part of the data word represents an integer portion of five and the output of the first output 3 may thus provide a value of five or an increment by one of five, i.e. six. It is to be noted that the values output by the first output 3 correspond to the number of high frequency clock pulses occurring between successive low frequency clock pulses as it is shown in the timing diagram 100 of FIG. 1.

The second output 4 may provide a second output data word which is an integer multiple of the second part of the input data word. Referring back to FIG. 1, the second part of a data word representing a fractional number of 16/3 corresponds to a value of 1/3. The second output 4 may thus output integer multiples of 1/3, i.e. n×1/3 with n being a natural number. For the timing diagram 100, the values output by the second output 4 may be 1/3, 2/3 or one, i.e. integer multiples of 1/3 smaller than or equal to a value of one.

Figure 3:
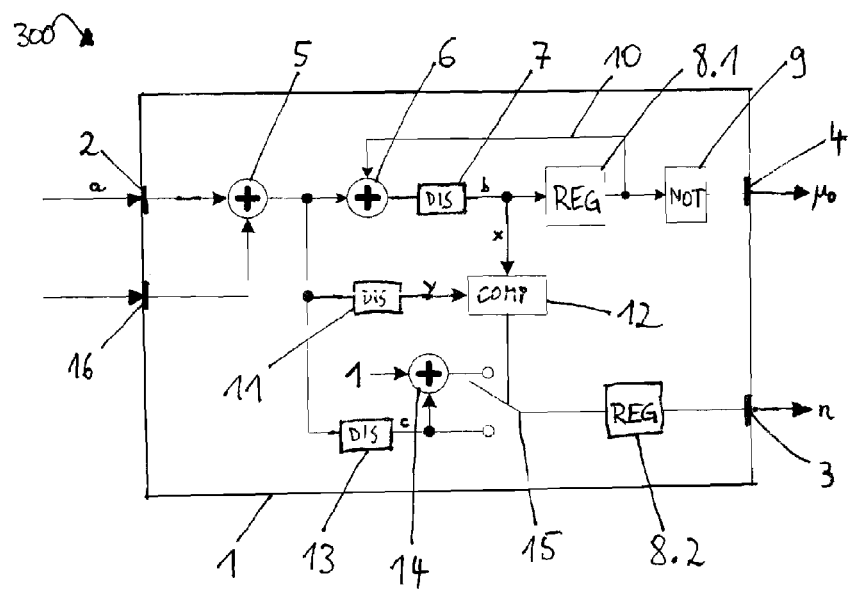
FIG. 3 schematically illustrates a digital device 300 as an exemplary embodiment.

FIG. 3 schematically illustrates a digital device 300 as an exemplary embodiment. The device 300 represents a more detailed implementation of the device 200 and may also be denoted by the reference sign 1. The device 1 includes a first input 2, a first output 3 and a second output 4, wherein the first input 2 is connected to a third adder 5. The third adder 5 is connected to a first (upper) signal path, a second (middle) signal path and a third (lower) signal path.

The first signal path includes a first adder 6, a first discarding unit 7, a first register 8.1 and a NOT gate 9 arranged in series. The first register 8.1 and the first adder 6 are connected by a feedback loop 10. The output of the NOT gate 9 is connected to the second output 4. The second signal path includes a second discarding unit 11 and a comparison unit 12 arranged in series. The comparison unit 12 is connected to the first signal path at a contact arranged between the first discarding unit 7 and the first register 8.1. The third signal path includes a third discarding unit 13, a second adder 14 and a switch 15. The switch 15 includes two switch positions selectively connecting the first output 3 to the third discarding unit 13 or the second adder 14. Moreover, the switch 15 is connected to the comparison unit 12 and a second register 8.2. The device 1 further includes a second input 16 connected to the third adder 5.

In the following, an operating mode of the device 300 will be explained using the timing diagram 100 of FIG. 1. The first time interval between the times $t_0$ and $t_{1,1}$ corresponds to a first operation cycle of the device 300. A ratio of a low frequency clock and a high frequency clock is input into the first input 2 of the device 300. A data word representing this ratio may, for example, be represented by 29 (e.g., unsigned) bits, wherein the 6 most significant bits (MSB) represent an integer portion of the ratio and the remaining 23 least significant bits (LSB) represent a decimal portion of the ratio. For the case of the timing diagram 100, the ratio might have a value of 16/3. Accordingly, the six MSB represent an integer portion of five and the 23 LSB represent a decimal portion of ⅓.

The ratio of the low frequency clock and the high frequency clock may be corrected by a correction value provided by the second input 16. The correction value is added to the ratio via the third adder 5. Such a correction may be helpful for the case of unstable frequency clocks that may occur for the case of unstable oscillators generating the frequency clocks. In the following example, the correction value is assumed to be zero.

The fractional value of 16/3 is forwarded to the first adder 6. Since the first register 8.1 is set to a value of zero for the first operation cycle of the device 300, the feedback loop 10 provides a value of zero to the first adder 6. The first discarding unit 7 thus receives a value of 16/3 and discards, e.g., deletes, the six MSB representing the integer portion of 16/3, i.e. a value of five. The remaining 23 LSB representing a value of 1/3 are forwarded to the first register 8.1. The NOT gate 9 receives the value of 1/3 and subtracts this value from a value of one leading to a value of 2/3 forwarded to the second output 4. The described subtraction corresponds to inverting the 23 LSB and may thus also be referred to as an inversion.

Still referring to the first operation cycle of the device 300, the second discarding unit 11 in the second signal path discards the six MSB and forwards the remaining 23 LSB representing a value of 1/3 to the comparison unit 12. In the lower signal path, the third discarding unit 13 discards the 23 LSB (in this example, a value of 1/3) and outputs the remaining six MSB representing a value of five. For the first operation cycle, the switch 15 is set to a default first switch position connecting the first output 3 to the output of the third discarding unit 13.

The comparison unit 12 compares a value x received from the first discarding unit 7 and a value y received from the second discarding unit 11. If the value x is smaller than the value y, then in response the comparison unit 12 controls the switch 15 in such a way that the switch 15 changes from the first switch position to a second switch position connecting the first output 3 to the second adder 14. If the switch 15 is in the second switch position, then in response the second adder 14 adds a value of one to the value output by the third discarding unit 13. In the first operation cycle, the values x and y both equal 1/3 and thus the switch 15 does not change from the first to the second switch position. Since no value of one is added by the second adder 14 during the first operation cycle, the first output 3 outputs a value of five.

In accordance with the timing diagram 100, the second output 4 outputs a value of 2/3 corresponding to the time offset $\mu_{O,1}$ and the first output 3 outputs a value of five corresponding to the number of clock pulses of the high frequency clock occurring during the first time interval between the times $t_0$ and $t_{1,1}$.

In the following, the second and third operation cycle of the device 300 will be explained. Here, the second operation cycle corresponds to the second time interval between the times $t_{1,1}$ and $t_{1,2}$ and the third operation cycle corresponds to the third time interval between the times $t_{1,2}$ and $t_0$. For a better understanding, the following Table 1 shows illustrative values at different locations in the device 300 during its different operation cycles.

TABLE 1

| Cycle No. | a | b | c | $\mu_O$ | n |
|---|---|---|---|---|---|
| 1 | 16/3 | 1/3 | 5 | 2/3 | 5 |
| 2 | 16/3 | 2/3 | 5 | 1/3 | 5 |
| 3 | 16/3 | 0 | 5 | 1 | 6 |

In Table 1, the parameter a denotes the value input to the first input 2, the parameter b denotes the value output by the first discarding unit 7, the parameter c denotes the value output by the third discarding unit 13, the value $\mu_O$ denotes the time offset output by the second output 4 and the parameter n denotes the number of high frequency clock pulses occurring during the regarded time interval output by the first output 3.

For the first operation cycle, the table values have already been derived: a=16/3, b=1/3, c=5, $\mu_O$=2/3 and n=5. Referring now to the second operation cycle, the ratio of the low frequency clock and the high frequency clock remains the same, i.e. a=16/3. The first adder 6 adds a value of 16/3 and a value of 1/3 (provided by the feedback loop 10) leading to a value of 17/3, the integer portion of which is discarded by the first discarding unit 7. Therefore, b equals a value of 2/3. Note that the addition performed by the first adder 6 may lead to an additional MSB for proper representation of the integer portion of the ratio. An inversion performed by the NOT gate 9 leads to a time offset value $\mu_O$ of 1/3 for the second operation cycle output by the second output 4.

Due to discarding the decimal portion of the input ratio 16/3, the third discarding unit 13 outputs a value c of five. Since x equals 2/3 and y equals 1/3, the switch 15 does not change to the second switch position connecting the first output 3 to the second adder 14. Accordingly, the second adder 14 does not add a value of one and the first output 3 outputs a value of five.

Referring now to the third operation cycle, the ratio input at the first input 2 still remains the same, i.e. a=16/3. The first adder 5 adds a value of 16/3 and a value of 2/3 (provided by the feedback loop 10) leading to a value of 18/3, whose integer portion of six is discarded by the first discarding unit 7. Therefore, b equals zero and the NOT gate 9 forwards a time offset $\mu_O$ of one to the second output 4.

Due to discarding the decimal portion of the input ratio 16/3, the third discarding unit 13 again outputs a value c of five. Since x now equals zero and y equals 1/3, the switch 15 changes from the first switch position to the second switch position connecting the first output 3 to the second adder 14. Accordingly, the second adder 14 adds a value of one to the value c and the first output 3 outputs a value of six.

As already mentioned in the description of FIG. 1, later time intervals may be obtained by simply repeating the first three time intervals. For example, a fourth time interval would then correspond to the first time interval, a fifth time interval would correspond to the second time interval, etc. In this connection, it is to be noted that the first register 8.1 may be reset to a value of zero after the third time interval has passed.

Figure 4:
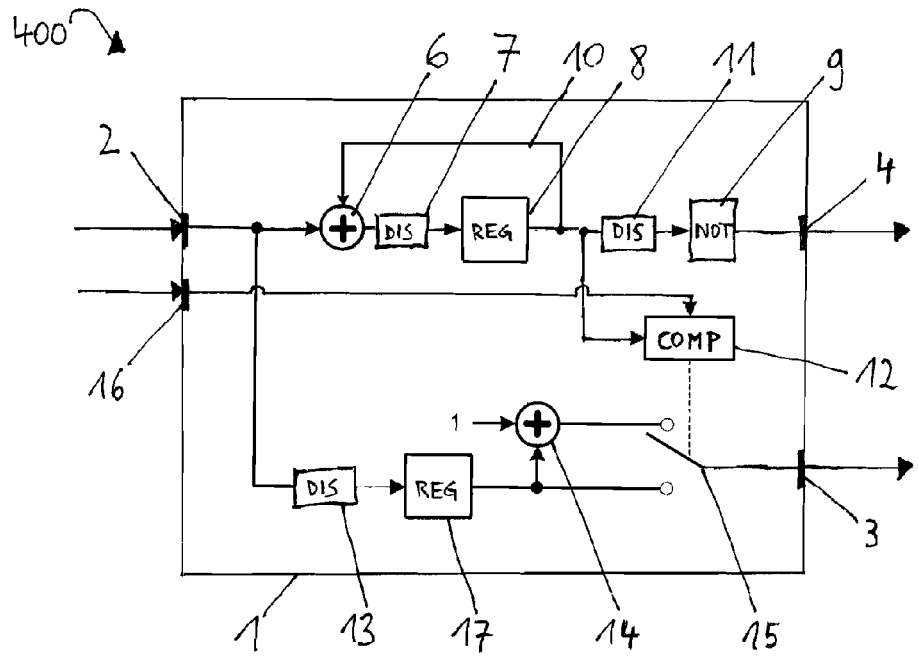
FIG. 4 schematically illustrates a digital device 400 as an exemplary embodiment.

FIG. 4 schematically illustrates a digital device 400 as an exemplary embodiment. The device 400 represents a more detailed implementation of the device 200 and may also be denoted by the reference sign 1. The device 1 includes a first input 2, a first output 3 and a second output 4, wherein the first input 2 is connected to a first (upper) signal path and a second (lower) signal path. The first signal path includes a first adder 6, a first discarding unit 7, a first register 8, a second discarding unit 11 and a NOT gate 9 arranged in series. The first register 8 and the first adder 6 are connected by a feedback loop 10. The output of the NOT gate 9 is connected to the second output 4.

The second signal path includes a third discarding unit 13, a second register 17, a second adder 14 and a switch 15. The switch 15 includes two switch positions selectively connecting the first output 3 to the second register 17 or the second adder 14. A comparison unit 12 is connected to the switch 15 and to the first signal path at a contact arranged between the first register 8 and the second discarding unit 11. The digital device 400 further includes a second input 16 connected to the comparison unit 12 to provide an external value.

The operating mode of the digital device 400 generally corresponds to the operating mode of the digital device 300. The description of FIG. 3 may thus be adapted to FIG. 4. A comparison of FIGS. 3 and 4 shows the following differences between the devices 300 and 400. In contrast to the device 300, the comparison unit 12 of the device 400 may be controlled by a value which may be provided by an external application via the second input 16. The digital device 400 includes an additional discarding unit 11 offering the possibility of discarding LSB, for example if lesser accuracy is desired. Further, the digital device 400 includes an additional register 17 which has been included to provide a required latency. In FIG. 4, the contact connecting the first signal path to the comparison unit 12 is arranged downstream of the first register 8, while the corresponding contact of FIG. 3 is arranged upstream of the first register 8. Note that the discarding unit 7 may also be arranged upstream of the first adder 6. This way, the first adder 6 receives the decimal portion of the input ratio.

Figure 5:
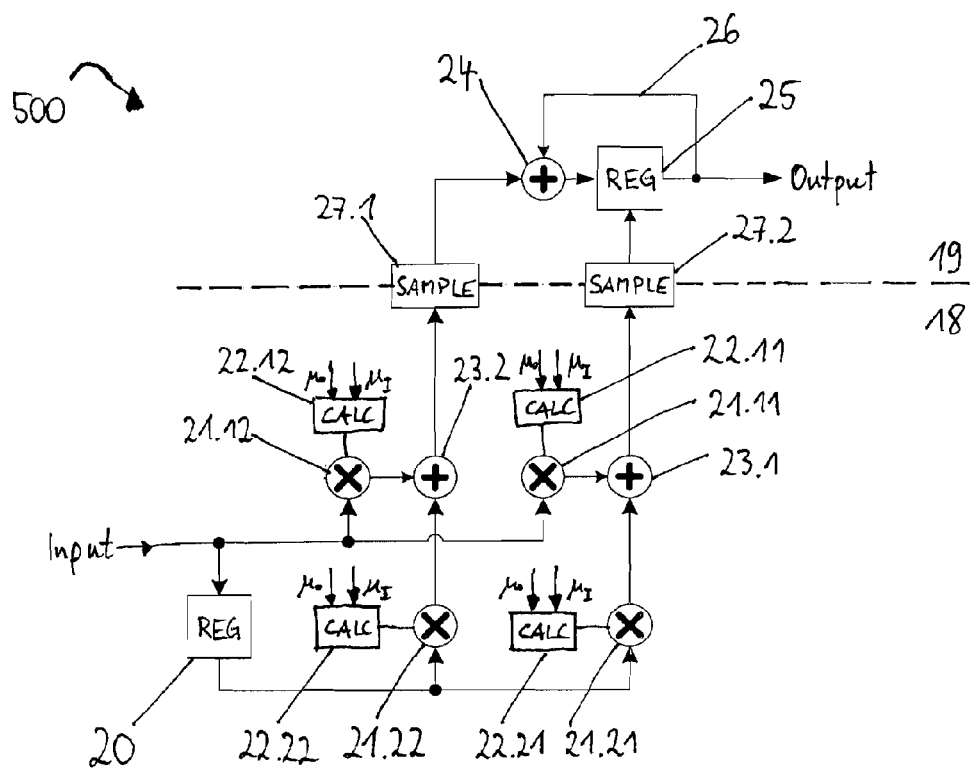
FIG. 5 schematically depicts an illustrative digital filter 500.

FIG. 5 schematically illustrates a digital filter 500. From the following description it will become apparent that the digital filter 500 receives specific input for its operation. For example, such an input may be provided by the digital device 300.

The digital filter 500 includes a first stage 18 operating at a low frequency clock and a second stage 19 operating at a high frequency clock. A ratio $\mu_I$ of the low frequency clock and the high frequency clock may be a fractional number. For the case of the timing diagram 100, the ratio $\mu_I$ may have values of 3/16 or 16/3.

The first stage 18 includes a first register 20, multipliers 21.11, 21.12, 21.21, 21.22, calculation units 22.11, 22.12, 22.21, 22.22 and adders 23.1, 23.2. The components included in the first stage 18 are connected amongst each other via signal paths as illustrated in FIG. 5.

The digital filter 500 is configured to receive input data to be filtered (cf. "Input"), the ratio $\mu_I$ of the low frequency clock and the high frequency clock and the time offset $\mu_O$. These input values may be received by an arbitrary number of inputs of the digital filter 500. Each of the calculation units 22.11 to 22.22 is configured to receive the values $\mu_I$ and $\mu_O$ and thus the input of the digital filter 500 receiving the values of $\mu_I$ and $\mu_O$ is connected to the calculations units 22.11 to 2.22. Note that the time offset $\mu_O$ received by the input of the digital filter 500 may be provided by the digital device 300.

The second stage 19 includes a closed-loop time-delay element having an adder 24 and a second register 25 arranged in series, wherein an output of the second register 25 is connected to an input of the adder 24 via a feedback loop 26. The second stage 19 may be referred to as integrator stage and further includes an output (cf. "Output") to provide filtered output data. The first stage 18 and the second stage 19 are connected by sampling circuits 27.1 and 27.2.

The digital filter 500 further includes a counter configured to count down an arbitrary number. For example, the counter may count down a number of clock pulses of the high frequency clock occurring between a first clock pulse and a second clock pulse of the low frequency clock (cf. timing diagram 100). The counter may be connected to the sampling circuit 27.2 in such a way that this circuit may set the second register 25 to a predetermined value when the counter has count down the first number. The predetermined value may correspond to a value stored in the sampling circuit 27.2. Note that the number of clock pulses to be counted down may be provided by the digital device 300.

In the following, an operating mode of the digital filter 500 will be explained. The digital filter 500 receives input data to be filtered (cf. "Input") of a low frequency clock. Since the digital filter 500 is a linear filter, its pulse response may be determined by four filter coefficients $k_{11}$, $k_{12}$, $k_{21}$, $k_{22}$ that may be written in form of a matrix $$M = \begin{pmatrix} k_{12} & k_{11} \\ k_{22} & k_{21} \end{pmatrix}. \quad (1).$$

Each of the calculation units 22.11 to 22.22 calculates a different one of the filter coefficients $k_{11}$, $k_{12}$, $k_{21}$, $k_{22}$ which are then multiplied with the input data to be filtered by means of the multipliers 21.11 to 21.22. Note that input data passing the first register 20 is delayed in comparison to input data not passing the first register 20.

The filter coefficients $k_{11}$, $k_{12}$, $k_{21}$, $k_{22}$ may depend on at least one of the ratio of the low frequency clock and the high frequency clock $\mu_I$ and the time offset $\mu_O$. Here, the calculation of the digital filter coefficients $k_{11}$, $k_{12}$, $k_{21}$, $k_{22}$ by means of the calculation units 22.11 to 22.22 may be based on an arbitrary functional relationship. For example, the matrix M may be derived to read $$M = \begin{pmatrix} 1 & \mu_o \\ -1 & \frac{1}{\mu_I} - \mu_o \end{pmatrix}. \quad (2).$$

The input data processed by the components (multipliers, adders, etc.) of the first stage 18 is forwarded to the sampling circuits 27.1 and 27.2 via two signal paths. The sampling circuit 27.1 is clocked with the high frequency clock and due to the summation performed by the adder 24, the value of the second register 25 is incremented at each clock pulse of the high frequency clock (cf. low peaks in FIG. 1). The sampling circuit 27.2 sets the value of the second register 25 to a predetermined value at each clock pulse of the high frequency clock following a clock pulse of the low frequency clock (cf. low peaks following the high peaks in FIG. 1). The times of these clock pulses are determined by the values of the time offset $\mu_O$ and the number n of clock pulses of the high frequency clock occurring between clock pulses of the low frequency clock. In particular, at or otherwise responsive to the clock pulses of the high frequency clock, the sampling circuit 27.2 writes processed input data received by the adder 23.1 into the second register 25.

For example, referring to the second time interval of FIG. 1, the counter of the digital filter 500 counts down from a value of five (cf. the five low peaks occurring between the times $t_{1,1}$ and $t_{1,2}$). Reaching the value of zero and taking into account the value of the time offset $\mu_{O,2}$, the sampling circuit 27.2 writes a value into the second register 25 at the time of, or otherwise responsive to, the clock pulse of the high frequency clock following the clock pulse of the low frequency clock at the time $t_{1,2}$.

From the above description, it becomes apparent that the digital filter 500 uses the values of the ratio $\mu_I$, the time offset $\mu_O$ and the number of high frequency clocks n (cf. Table 1) for its operation. The value of n output by the first output 3 of the digital device 300 is used to set the second register 25 of the digital filter 500 to a predetermined value at the right time. Moreover, the time offset $\mu_O$ output by the second output 4 of the digital device 300 is used for the calculation units 22.11 to 22.22 to calculate the filter coefficients $k_{11}$, $k_{12}$, $k_{21}$, $k_{22}$ of the digital filter 500. It is understood that the output values of the digital device 300 may also be used by any other circuit element working on two different frequency clocks.

What is claimed is:

1. An apparatus, comprising:
   a first input configured to receive a first signal representing a frequency ratio of a first clock and a second clock, wherein the second clock has a higher frequency than the first clock;
   a first output configured to provide a second signal representing a number of clock pulses of the second clock occurring between a first clock pulse and a second clock pulse of the first clock; and
   a second output configured to provide a third signal to a digital processing logic, wherein the third signal represents a time offset between (1) a clock pulse of the second clock that occurs between the second clock pulse and a third clock pulse of the first clock, and (2) the second clock pulse of the first clock, and
   wherein the digital processing logic comprises:
      a first stage configured to operate at the first clock; and
      a second stage configured to operate at the second clock.

2. The apparatus of claim 1, wherein the ratio of the first clock and the second clock is a fractional number.

3. The apparatus of claim 1, wherein the second clock pulse of the first clock occurs after the first clock pulse of the first clock, and the third clock pulse of the first clock occurs after the second clock pulse of the first clock.

4. The apparatus of claim 1, wherein the ratio of the first clock and the second clock is represented by a first bit sequence.

5. The apparatus of claim 1, further comprising:
logic configured to add a correction value to the ratio of the first clock and the second clock.

6. The apparatus of claim 1, wherein the first output is configured to provide the second signal to the digital processing logic.

7. The apparatus of claim 1, further comprising:
a first signal path coupled between the first input and the second output, wherein the first signal path comprises a first logic configured to increment a value, wherein the first logic configured to increment a value is coupled to the first input; and
a second signal path coupled between an output of the first logic configured to increment a value and the first output.

8. The apparatus of claim 7, wherein the second signal path comprises a second logic configured to increment a value.

9. The apparatus of claim 7, wherein the first signal path further comprises a first discarding logic and a first storage, wherein the first logic configured to increment a value, the first discarding logic, and the first storage are coupled in series.

10. The apparatus of claim 9, further comprising:
a second logic configured to increment a value having a first input coupled to an output of the first logic configured to increment a value; and
a feedback path coupling the output of the first storage to a second input of the second logic configured to increment a value.

11. The apparatus of claim 9, wherein the second signal path comprises a second discarding logic and a second storage in series with each other, wherein an output of the second discarding logic is coupled to the output of the first logic configured to increment a value.

12. The apparatus of claim 11, further comprising a third discarding logic and a comparator, wherein the comparator comprises:
a first input coupled to an output of the third discarding logic,
a second input coupled to an output of the first discarding logic, and
an output coupled to an input of the second storage.

13. An apparatus, comprising:
a first input configured to receive a first signal representing a frequency ratio of a first clock and a second clock, wherein the second clock has a higher frequency than the first clock;
a first output configured to provide a second signal representing a number of clock pulses of the second clock occurring between a first clock pulse and a second clock pulse of the first clock;
a second output configured to provide a third signal representing a time offset between (1) a clock pulse of the second clock that occurs between the second clock pulse and a third clock pulse of the first clock, and (2) the second clock pulse of the first clock; and
a feedback loop, wherein at least one of determining the second signal and determining the third signal is based on the feedback loop.

14. The apparatus of claim 13, wherein the feedback loop is arranged between the first input and the second output.

15. The apparatus of claim 13, further comprising:
a first logic configured to increment a value;
a storage arranged in series with the first logic configured to increment a value, wherein the feedback loop couples the storage to the first logic configured to increment a value; and
a first discarding logic, wherein the ratio of the first clock and the second clock is represented by a first bit sequence,
wherein the first logic configured to increment a value is configured to add the ratio of the first clock and the second clock with a value received by the feedback loop and to output a second bit sequence, and
wherein the first discarding logic is configured to generate a third bit sequence by discarding at least one of the bits of the second bit sequence.

16. The apparatus of claim 15, further comprising:
a second discarding logic configured to generate a fourth bit sequence by discarding at least one of the bits of the first bit sequence; and
a comparison logic configured to compare the third bit sequence with the fourth bit sequence.

17. The apparatus of claim 16, further comprising:
a third discarding logic configured to generate a fifth bit sequence by discarding at least one of the bits of the first bit sequence; and
logic configured to add a value of one to the fifth bit sequence.

18. The apparatus of claim 17, further comprising:
a switch, controlled by the comparison logic, configured to switch between coupling the third discarding logic to the first output and coupling the logic configured to add a value of one to the fifth bit sequence to the first output.

19. The apparatus of claim 15, further comprising:
an inversion logic arranged in series with the storage.

20. A method, comprising:
receiving an indication of a ratio of a frequency of a first clock and a second clock, wherein the second clock has a higher frequency than the first clock;
generating an indication of a number of clock pulses of the second clock occurring between a first clock pulse and a second clock pulse of the first clock;
generating an indication of a time offset between (1) a clock pulse of the second clock that occurs between the second clock pulse and a third clock pulse of the first clock, and (2) the second clock pulse of the first clock; and
providing the indication of the time offset to a digital processing logic comprising:
a first stage configured to operate at the first clock; and
a second stage configured to operate at the second clock.

21. The method of claim 20, wherein the ratio of the first clock and the second clock is a fractional number.

22. The method of claim 20, further comprising:
providing, to the digital processing logic, the indication of the number of clock pulses of the second clock occurring between a first clock pulse and a second clock pulse of the first clock.

\* \* \* \* \*